(12) United States Patent
Sugita et al.

(10) Patent No.: US 6,597,874 B2
(45) Date of Patent: Jul. 22, 2003

(54) CAMERA

(75) Inventors: Yukihiko Sugita, Kokubunji (JP); Masami Takase, Hino (JP); Takaaki Ue, Hachioji (JP); Hitoshi Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/934,291

(22) Filed: Aug. 21, 2001

(65) Prior Publication Data

US 2002/0025168 A1 Feb. 28, 2002

(30) Foreign Application Priority Data

Aug. 22, 2000 (JP) ........................................ 2000-251121

(51) Int. Cl.[7] .............................................. G03B 17/02
(52) U.S. Cl. ....................................................... 396/541
(58) Field of Search ................................ 396/541, 535, 396/538, 542

(56) References Cited

U.S. PATENT DOCUMENTS

| 2,911,894 A | * | 11/1959 | Hennig et al. | ............... 396/353 |
| 4,769,665 A | * | 9/1988 | Dagborn | ..................... 396/213 |
| 6,324,348 B1 | * | 11/2001 | Terada | ........................ 396/535 |

FOREIGN PATENT DOCUMENTS

JP  5-173223 A  7/1993

* cited by examiner

*Primary Examiner*—David Gray
(74) *Attorney, Agent, or Firm*—Frishauf, Holtz, Goodman & Chick, P.C.

(57) ABSTRACT

In a camera having a camera body unit constituted by combining a plurality of units, the camera configuration is realized so as to allow to easily remove only a lens frame unit from the camera body unit before the other units (for example, a strobe unit, a finder unit, a film feed unit and the like) when the camera is disassembled to repair or replace the lens frame unit by constituting so that the lens frame unit having a photographing optical system can be mounted independently.

20 Claims, 6 Drawing Sheets

CAMERA

CROSS-REFERENCE TO RELATED APPLICATIONS

This application is based upon and claims the benefit of priority from the prior Japanese Patent Application No. 2000-251121, filed Aug. 22, 2000, the entire contents of which are incorporated herein by reference.

BACKGROUND OF THE INVENTION

1. Field of the Invention

The present invention relates to a camera constituted by combining a plurality of units.

2. Description of Related Art

Conventionally, it has been made generally to constitute to satisfy functions as the whole camera, by combining appropriately a plurality of units according a to the functions. It is very effective for reducing a fault generation rate during the camera assembly by performing the performance check of each unit, before assembling the camera, and increasing the assembly efficiency. Typically, the camera assembly is performed by attaching the plurality of function units to a camera body member comprising a cartridge chamber for housing a film cartridge, a spool chamber for winding a film in the film cartridge, an opening (aperture) for photographing, and the like.

In many cases, a lens frame unit including a photographing optical system is mounted at the initial stage of camera assembly and, thereafter, other function units are mounted on the camera body member. Therefore, at the disassembly of a completed camera, the lens frame unit is removed at the last stage of disassembly.

Similarly, in a zoom type camera having a variable magnification photographing optical system as proposed in Jpn. Pat. Appln. KOKAI Publication No. 5-173223, it is necessary to link the lens frame unit and a finder unit by means of a driving coupling mechanism such as link, cam or the like in order to take correlation of variable magnification quantity between the lens frame unit having this variable magnification photographing optical system, and the finder unit having a variable magnification finder optical system. Consequently, in case of removing the lens frame unit from the camera body member, first, the finder unit is removed, and at the same time, the coupling of the driving coupling mechanism is released, followed by taking out the lens frame unit.

Among the respective units constituting a camera, the lens frame unit including the photographing optical system requires a high accuracy for securing optical performance. In addition, complicated mechanisms requiring respectively a high accuracy such as focusing mechanism, variable magnification mechanism in case of zoom type camera, driving mechanism for retracting the barrel when not used, and shutter mechanism for lens shutter camera are incorporated, which increases an occurrence rate of fault or the like compared to the other function unit. Besides, since a part of the lens frame unit often protrudes outside, the unit is likely to receive impact from outside when dropped, and this is also one of causes of increase in the occurrence rate of fault or the like of the lens frame unit.

On the other hand, in case where any fault has occurred in only the lens frame unit, only the lens frame unit can be replaced or repaired, however, in the conventional camera as mentioned above, it was necessary to remove also printed circuit board, finder unit or the like, when the lens frame unit is removed from the camera body member. Consequently, it took time and cost for disassembly and repair.

The present invention has been made in consideration of the above problems and has an object to provide a camera capable of performing the disassembly, repair and assembly easily, by making the lens frame unit easily detachable with respect to the camera body member.

BRIEF SUMMARY OF THE INVENTION

In order to solve the problems and achieve the object, according to a first aspect of the present invention, there is provided a camera constituted by combining a plurality of units, comprising a camera body member, a lens frame unit attachable to the camera body member, and a function unit which is a unit other than this lens frame unit and is attachable to the camera body member. The lens frame unit is constituted to be coupled to or separated from the camera body member in a state where the coupling between the function units and the camera body member is maintained.

In addition, according to a second aspect of the present invention, there is provided a camera, comprising a camera body member, a photographing optical unit including a photographing optical system attachable to the camera body member, and a finder unit including a finder optical system for observing a photography object. It is so constituted that the photographing optical unit and the finder unit can be mounted on the camera body member, and the photographing optical system can be removed from the camera body member without removing the other units from a state where these plurality of units are mounted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Hereinafter, the subjects of the present invention will be described by referring to concrete examples and FIGS. 1 to 7.

Figure 1:
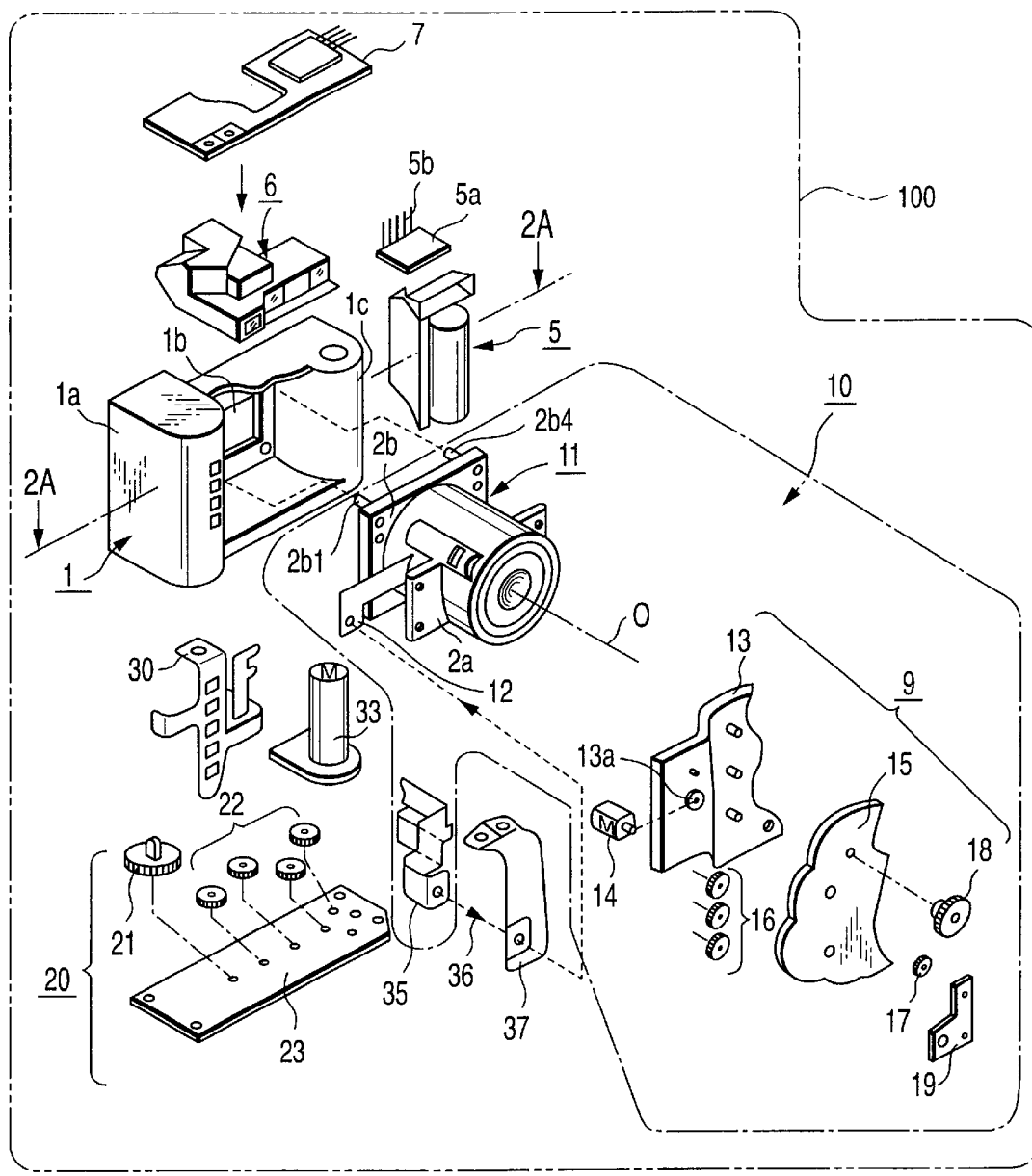
FIG. 1 is an exploded perspective view schematically showing a configuration of a camera according to the present invention.

FIG. 1 is an exploded perspective view schematically showing a plurality of units and elements constituting a camera of the present invention.

This camera is mainly constituted of a camera body member 1 constituting a basic member of the configuration thereof, a strobe unit 5 for emitting a flash, a lens frame unit 11 including a variable magnification photographing optical system, a driving unit 9 for changing a magnification by driving the photographing optical system in the optical axis direction, a finder unit 6 including a finder optical system which is variable in magnification by the driving unit 9, and a film feed unit 20 for winding/rewinding a film. An integral camera body unit is constituted by sequentially attaching the respective units 5, 6, 9, 11 and 20 to the camera body member 1 as mentioned below.

A rectangular aperture 1b is opened for determining a photography screen, at the substantially center portion of the camera body member 1. A film cartridge chamber 1a capable of housing a film cartridge having a film incorporated therein is provided at one end of both wings across this aperture 1b, and a spool chamber 1c for housing a film exiting from the film cartridge at the other end.

Next, the function and the setting position will be described for the respective units to be mounted on the camera body member 1.

The strobe unit 5 has a flashing portion made of a flashing tube and, a reflection umbrella for reflecting a light flux emitted by this flashing tube in a predetermined direction, and a capacitor 42 is attached to supply the flashing tube with necessary electric power at the time of flashing. Further, a strobe substrate 5a on which electric parts for light emission control of the flashing portion is attached. Then, it is connected to a main substrate 7 mentioned below through a lead wire 5b extending from this strobe substrate 5a.

The finder unit 6 is a unit provided with a finder optical system, a distance measuring device and the like, and is mounted at the top middle of the camera body member 1. The finder optical system is a variable magnification optical system interlocking with the magnification of the photographing optical system built in the lens frame unit 11, and becomes power variable in synchronization with the photographing optical system by appropriately coupling with the driving unit 9 mentioned below.

A main substrate (M substrate) 7 on which a CPU or the like which is a central processing unit for surveying and controlling this whole camera is mounted is attached to the top face of the finder unit 6 including this finder optical system with this variable magnification function, and connected directly or indirectly and controllably to a plurality of flexible substrates (described in detail below) dedicated for the respective units through each connection wire such as the lead wire 5b or the like.

The driving unit 9 is constituted of a driving source, a plurality of gears, bases for supporting them and the like, and transmits to the respective units a driving force for changing the magnification of the optical system of the finder unit 6 and the lens frame unit 11.

Specifically, a spindle of a zoom motor 14 serving as the driving source passes through a hole from behind at the middle of a boss 13a of a front plate 13 serving as a base of the driving unit 9, and allows to transmit the driving force of the zoom motor 14 to the lens frame unit 11 via a zoom gear line 16 or the like coupled to a pinion gear fixed to the tip thereof and pivoted by the front plate 13.

A zoom base plate (Z base plate) 15 is fixed to the front plate 13, serves as a stopper of the zoom gear line 16 or the like pivoted by the front plate 13, and functions as a protect cover. Further, a first FZ gear 17 and a second FZ gear 18 constituting a part of a finder zoom gear (FZ gear) line which is branched from the zoom gear line 16 to transmit the driving force of the zoom motor 14 to the finder unit 6 are pivoted between a finder zoom base plate (FZ base plate) 19 fixed to a Z base plate 15 and the Z base plate 15. These driving units 9 can be mounted on the lens frame unit 11.

The lens frame unit 11 is a unit which includes the photographing optical system and which can zoom drive the photographing optical system in the optical axis direction by the driving unit 9 adjacent thereto, and is integrated at a position aligning the optical axis O along the central axis passing through near the middle of the aperture 1b. A lens frame flexible substrate (K flex) 12 is fixed to this lens frame unit 11 in advance. This lens frame unit 11 is structured to be engaged into the respective holes near the four corners of the aperture 1b opened in the camera body member 1, by four engagement claws 2b1 to 2b4 or protrusions provided at four corners of a lens frame assembly portion 2b extending in a substantially square form at the rear end thereof (for detail, refer to FIG. 4).

A film feed unit 20 is a unit for transmitting the rotation force from a spool motor 33 disposed in the spool chamber 1c as film feeding force. A large diameter gear 21 for constituting this film feed system, and a small diameter gear line 22 of which one is meshed with the gear 21 are arranged on a feed system base plate 23 which pivots the respective gears, and mounted, for example, in the lower part of the camera body member 1.

In addition to main units such as the strobe unit 5, the finder unit 6, the lens frame unit 11 and the film feed unit 20 and the like mentioned above, the following components are also attached to the respective predetermined positions.

Figure 2:
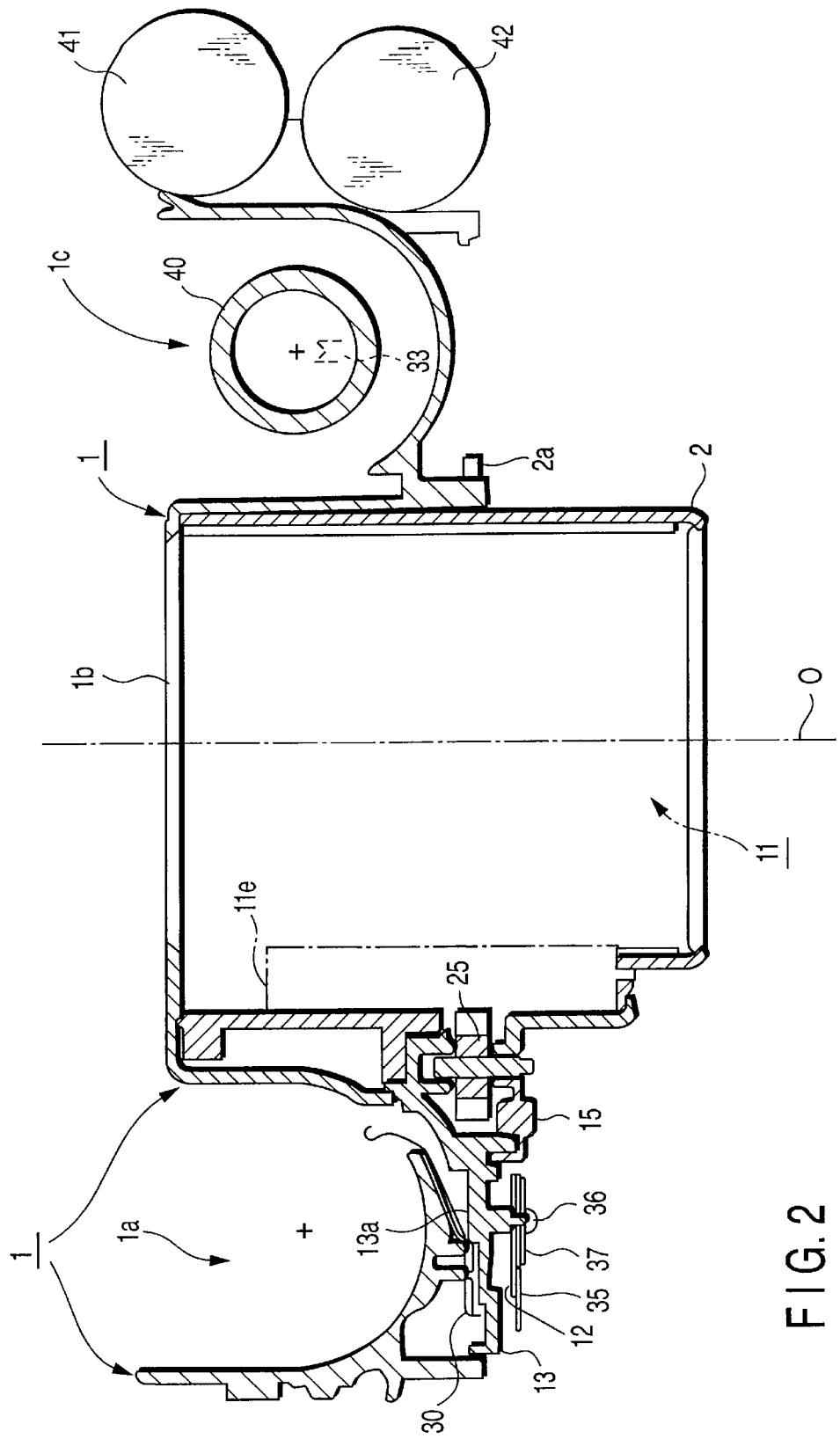
FIG. 2 is a cross section view showing the configuration of the camera taken along the line 2A—2A in FIG. 1.

For example, near the film cartridge chamber 1a, a DX flexible substrate (DX flex) 30 for electrically reading information printed on the surface of a film cartridge to be loaded in this film cartridge chamber 1a is arranged along a line of rectangular windows formed vertically on the wall surface outside the chamber thereof (for detail, refer to FIG. 2).

In addition, dedicated electric boards for the respective units are arranged in this camera. For instance, motor as driving source for focus adjustment or shutter opening/closing, solenoid plunger, position detection sensor necessary for their control and the like are mounted on the mirror frame flexible substrate (K flex) 12.

The lens frame unit 11, the zoom motor 14 or driving source for power variation of the finder unit 6, or sensor for detecting the revolution of this zoom motor 14 and the like are mounted on the zoom flexible substrate (Z flex) 35.

For a flexible substrate (MA flex) 37, the Z flex 35 and K flex 12 are superposed by a predetermined order at a substrate connection portion (connect portion) 36 at one end thereof, fixed and connected by means of screw or the like. Also, the MA flex 37 is connected to the M substrate 7 at the other end. Thus, the Z flex 35 and the K flex 12 are connected with the M substrate 7 through the MA flex 37, and can be controlled by the CPU or the like mounted on the M substrate 7.

Besides, since electric boards on which electric parts necessary for driving the respective units are mounted are arranged respectively, the operation of respective units can be easily checked in a state where the respective units are mounted up.

A unit in which the respective units are attached to the camera body unit 1, and various electric boards are connected will be noted as a "camera body unit 100". In the state of this camera body unit 100, various functions required for a camera can be examined, confirmed across the respective units. Then, the camera assembly finishes by covering this camera body unit 100 with an external member (not shown). In other words, what is illustrated is the state where the external member is removed for assembling or repairing the camera.

Now, a state where respective units are attached to the camera body unit 1, in the camera of this embodiment will be described by referring to FIGS. 2 to 4.

Figure 3:
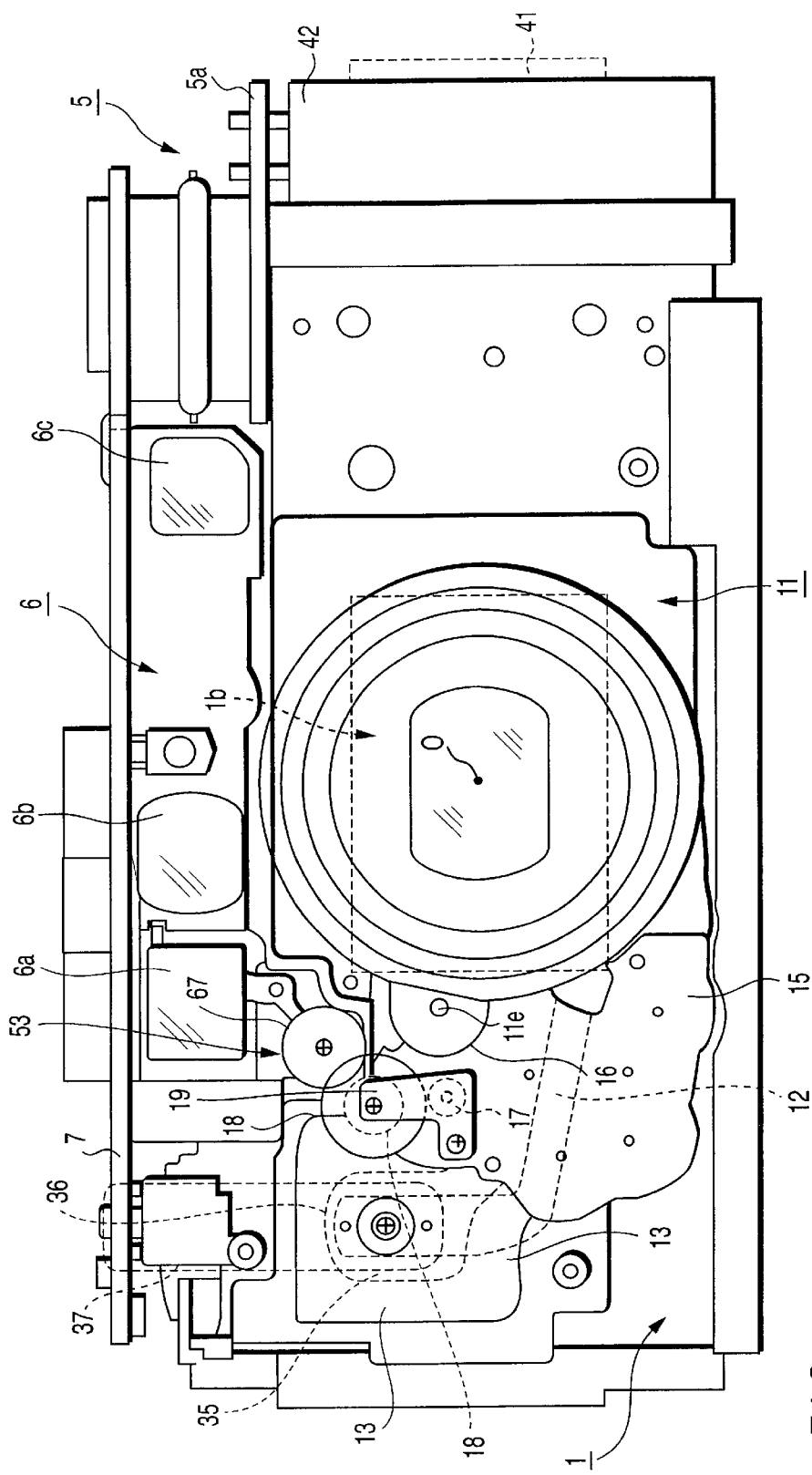
FIG. 3 is a front view of the configuration of the camera viewed from the front in a state where the respective components in FIG. 1 are assembled.
Figure 4:
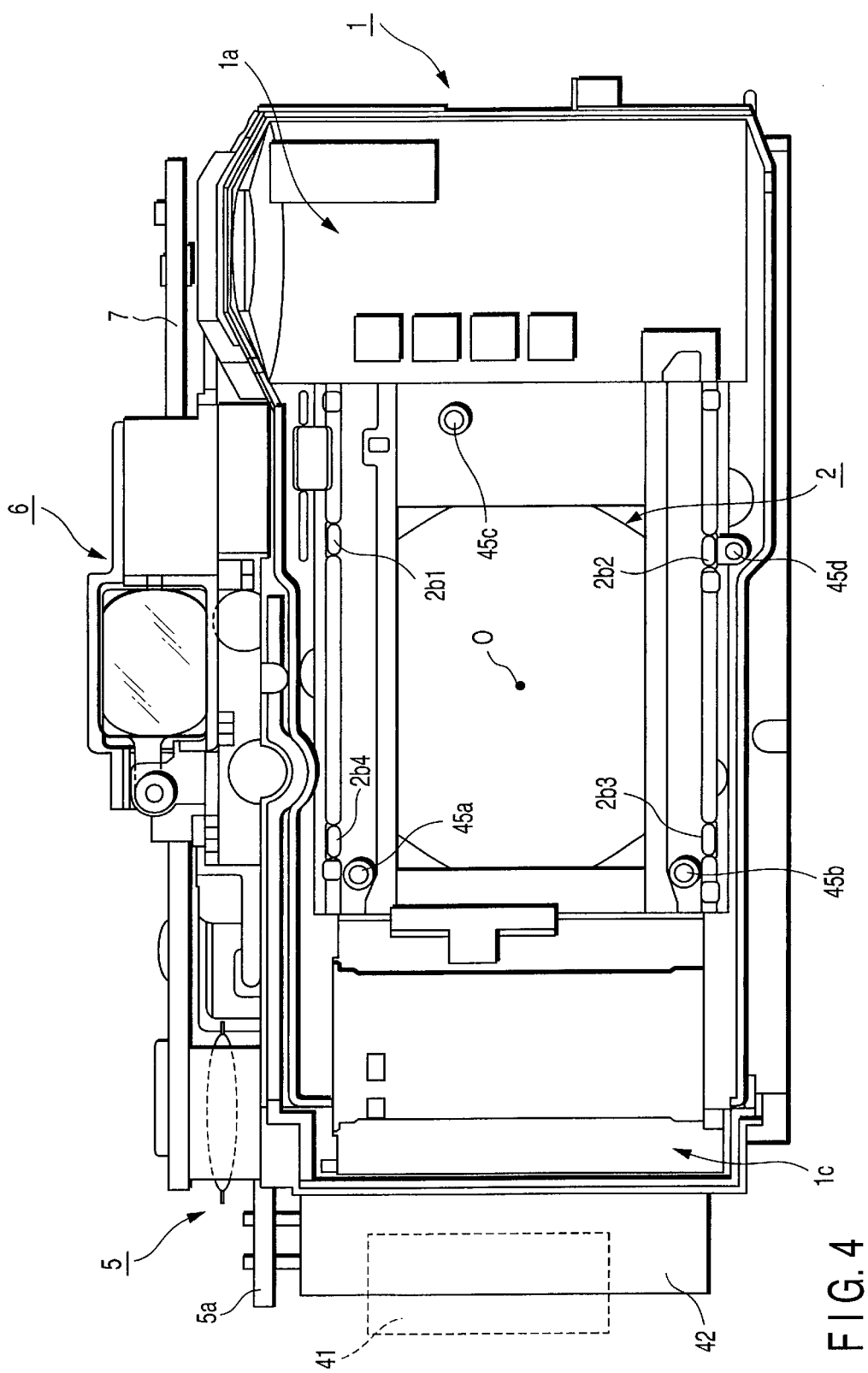
FIG. 4 is a rear view of the configuration of the camera body viewed from the back.

FIG. 2 is a cross section view taken along the line 2A—2A in FIG. 1 in a state where the respective units are attached to the camera body unit 1, while FIGS. 3 and 4 show respectively the appearance viewed from the camera front side and back side in the state where the respective units are attached to the camera body unit 1. Note that, in FIG. 2, it is described by omitting the FZ base plate 19, first and second FZ gears 17, 18 and the like.

The lens frame unit 11 is mounted at the substantial center of the camera body member 1. The position of this lens frame unit 11 is regulated with respect to the camera body member 1 by engaging convex portions 2b1 to 2b4 provided on a fixing frame 2 into the engagement holes provided on the camera body member 1, and is fixed by screws 45a to 45d from behind the camera. Therefore, the mechanical coupling between the camera body member 1 and the lens frame unit 11 is released by removing these screws 45a to 45d.

The driving unit 9 is fixed to a front plate mounting portion 2a of the fixing frame 2 of the lens frame unit 11 with screw or the like, and the photographing optical system of the lens frame unit 11 is made possible to drive by varying the magnification. Thus, an integral unit of the lens frame unit 11 and the driving unit 9 will be note as a "driving lens frame unit 10 with driving unit", a "driving lens frame unit" or a "photographing optical unit". In the camera of hits embodiment, the driving lens frame unit 10 with driving unit can be handled as a single unit, and can be mounted on or removed from the camera body member 1, in the state of driving lens frame unit 10 with driving unit.

By constituting so, the mechanical coupling between the driving lens frame unit 10 with driving unit and the camera body member 1 can be released only by removing the screws 45a to 45d.

Further, in this embodiment, the inspection of an internal driving mechanism of the lens frame unit 11, for example, inspection of shutter mechanism or focusing mechanism, and the check of the variable magnification mechanism of the lens frame unit 11 can be performed by the driving lens frame unit 10 with driving unit which is a single unit, by constituting so that the lens frame unit 11 and the driving unit 9 can be handled as an integral unit. That is, substantially all the functions of this unit 10 can be inspected in a state where the driving lens frame unit 10 with driving unit is not mounted on the camera body member 1.

The finder unit 6 is provided with a finder optical system 6a, an AF projector window 6b and an AF light receiving window 6c and the like, and s fixed to the upper part of the camera body member 1. There, power is transmitted from the first FZ gear 17, the second FZ gear 18 or the like as finder variable magnification gear pivoted by the driving unit 9 which is a part of the driving lens frame unit 10 with driving unit, and the finder optical system 6a becomes capable of variable magnification driving in synchronization with the variable magnification state of the photographing optical system that the driving lens frame unit 10 has.

Further, the strobe unit 5 is fixed to the spool chamber 1c side end portion of the camera body member 1, while the film feed unit 20 is fixed to the lower part of the camera body member 1.

Thus, various main function units of the camera of this embodiment are fixed to the camera body member 1, and various electric boards are attached thereto, and are connected mutually, so that the respective units can perform various functions as a camera.

The M substrate 7 on which a central processing circuit supervising various controls of this camera are mounted is disposed so as to cover a part of the finder unit 6, and is fixed at the upper part of the film cartridge chamber 1a and the spool chamber 1c of the camera body member 1. There, various electric boards are directly or indirectly connected to the M substrate 7, allowing to control the driving of various units.

The K flex 12 provided on the lens frame unit 11 is connected to the MA flex 37 with the Z flex 35 provided on the driving unit 9. And, the connection of this MA flex 37 with the M substrate 7 allows the K flex 12 and Z flex 35 to connect indirectly to the M substrate 7.

The strobe substrate 5a provided on the strobe unit 5 is connected with the M substrate 7 through the lead wire 5b.

Further, a DX flex 30 arranged in the camera body member 1 is attached to the front of the film cartridge chamber 1b of the camera body member 1, and one end thereof is connected to the M substrate 7. Then, as shown in FIG. 2, this DX flex 30 is disposed between the camera body member 1 and the driving lens frame unit 10 with driving unit. Specifically, the DX flex 30 is disposed between the outer wall of the film cartridge chamber 1b and the front plate 13. Therefore, the driving lens frame unit 10 with driving unit can be removed from the camera body member 1 without removing the DX flex 30.

Thus, the electric connection relationship of the driving lens frame unit 10 with driving unit with the camera body member 1 is released, by releasing these connection relationship at the connect portion 36 connecting K flex 12, Z flex 35, and MA flex 37. Therefore, the driving lens frame unit 10 with driving unit becomes electrically independent from the camera body member 1 only by releasing the connection relationship of the connect portion 36 when the driving lens frame unit 10 is removed from the camera body member 1.

Figure 5:
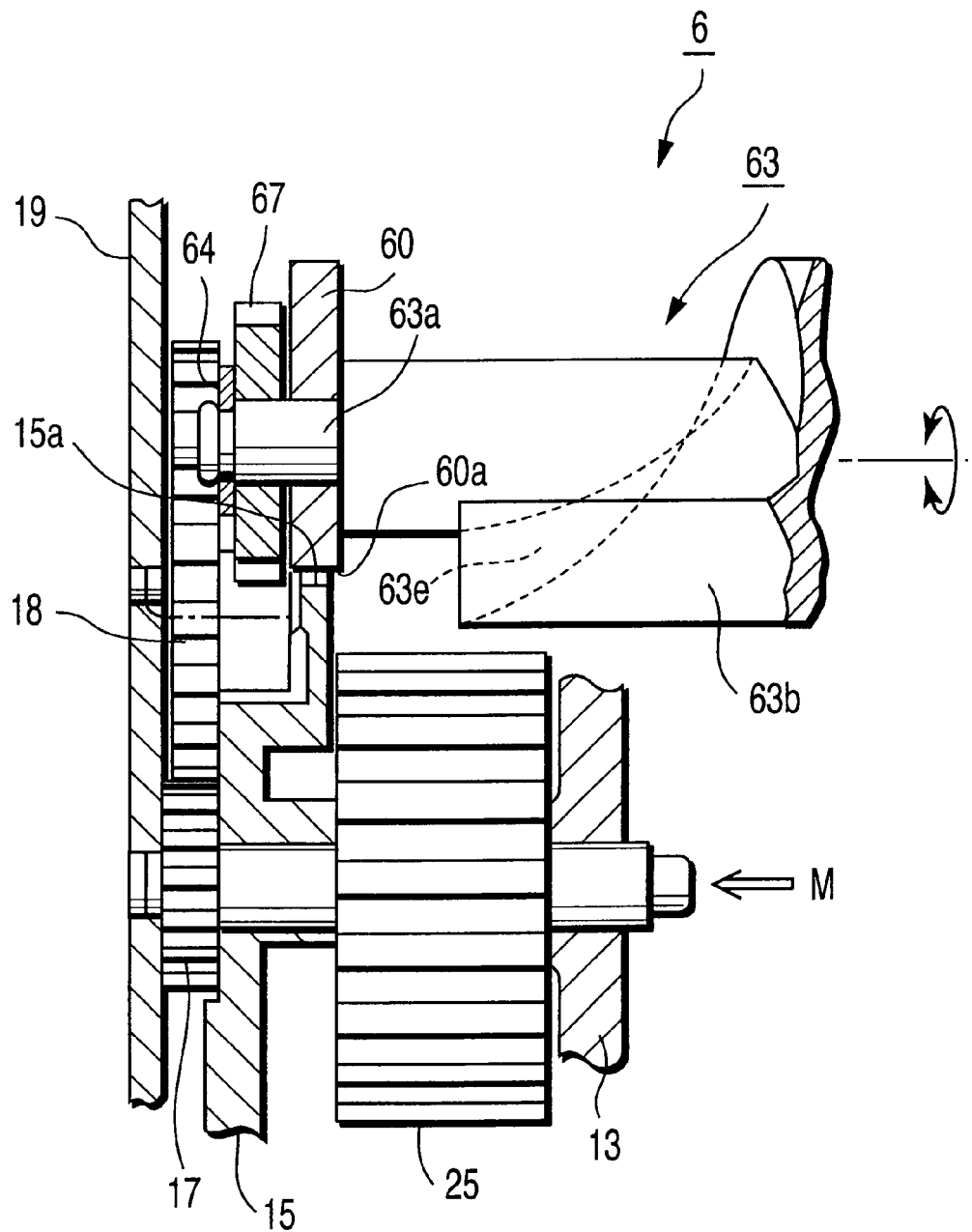
FIG. 5 is a side view showing a gear line of a zoom driving system and a finder variable magnification mechanism of the camera.

The gear coupling relationship between the finder unit 6 and the variable magnification mechanism concerning the lens frame unit 11 in the camera of the present invention will be described in detail by further referring to FIGS. 5 to 7. First, FIG. 5 is a side view showing the meshing relationship concerning the gear line of the zoom driving system of this camera, and a part of the finder variable magnification mechanism interlocking with this zoom driving system.

The aforementioned front plate 13, the base plate (Z base plate) 15, and the finder zoom base plate (FZ base plate) 19 have a predetermined gear line interposed rotatably among these plates, and a group of small gears are arranged as shown through the second FZ gear 18 for transmitting the driving force from the zoom motor (M) 14 as driving source.

A zoom gear line 16 constituted of a plurality of small diameter gears is arranged between the front plate 13 and Z base plate 15 mounted mutually. Moreover, the FZ base plate 19 pivoting the first and second FZ gears 17, 18 constituting the finder variable magnification mechanism in the meshed state, is disposed pinching these respective FZ gears 17, 18 between the Z base plate 15.

Rotational driving force from the zoom motor 14 rotates a finder cam gear (F cam gear) 67 engaged with the end portion of a finder cam (F cam) 63 mentioned below through the first FZ gear 17 constituting the finder zoom gear pivoted between the Z base plate 15 and the FZ base plate 19, and the second FZ gear 18 meshing with the same, and is constituted to be convertible so as to advance or retreat the optical lens of the finder system in the forward and backward direction of the optical axis thereof by the cam mechanism by this F cam.

Figure 6:
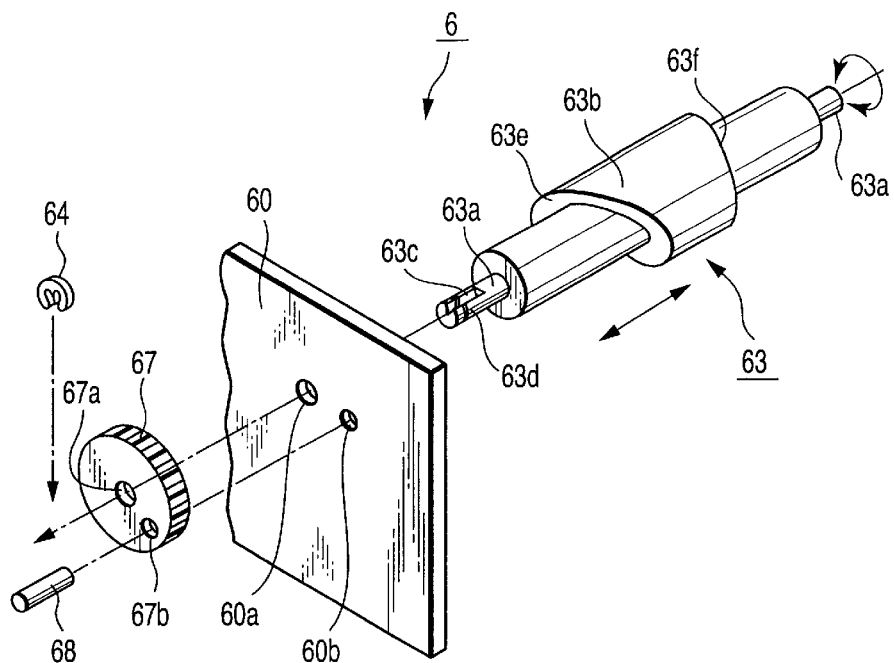
FIG. 6 is an exploded perspective view showing the configuration of the finder variable magnification mechanism of the camera.

The basic configuration of the finder variable magnification mechanism is as shown in FIG. 6. The F cam 63 has at the end portion a cam shaft 63a formed on a cam shaft peripheral surface 63a where a V cut portion 63c notched in V-shape is formed for gear engagement and a lateral groove protrudes and, in the vicinity of the middle, a cam portion 63b having a first thick cam face 63e and a second cam face 63f in a continuous diameter direction crossing the axial center thereof with a predetermined angle.

A cam gear hole 67a, a pin gear hole 67b and two F cam gear holes are formed on the F cam gear 67 as illustrated.

In addition, the F cam 63 is coupled with the F cam gear 67 through a cam hole 60a opened on the finder unit body wall face 60 constituting the finder unit 60, and this F cam gear 67 is engaged securely by meshing and fitting an E type ring 64 by the lateral groove with the V cut portion 63c at the tip thereof.

Figure 7:
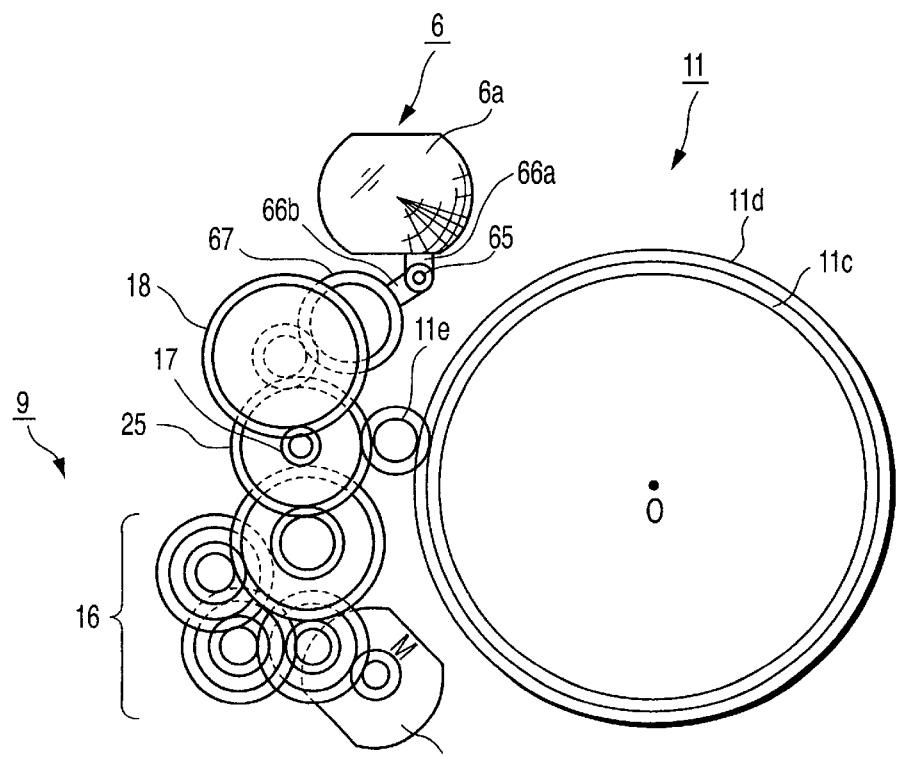
FIG. 7 is a front view schematically showing the gear configuration and coupling state of a lens driving system of the camera.

The gear line concerning the driving system of this camera links as schematically shown in FIG. 7. As mentioned above, the finder unit 6 to be mounted above the camera body member 1, has a finder optical system with variable magnification mechanism interlocking with the variable magnification operation of the zoom lens of the lens frame unit 11. Specifically, the variable magnification mechanism of this finder unit 6 divides the driving force of the zoom motor 14 which is the driving source for variable magnification of the lens frame unit 11 in the middle of a gear line transmitting from this zoom motor 14 to the lens frame unit 11, and transmits to the finder unit 6.

The lens frame unit 11 is variable magnification driven by reducing the driving force of the zoom motor 14 by a predetermined amount and rotating a lens frame peripheral face gear 11d formed over the peripheral surface of a lens frame body 11c arranged inside the fixing frame 2 by a long gear 11e. The finder unit 6 is variable magnification driven by reducing the driving force of the zoom motor 14 by a predetermined amount when the lens frame unit 11 is variable magnification driven, and driving a part of finder optical system in the optical axis direction by the finder cam (F cam) 63 rotationally driven through the first FZ gear 17, the second FZ gear 18 or the like acting as finder variable magnification gear.

Thus, a variable magnification state corresponding to the zooming operation of the photographing optical system including the zoom lens can be obtained also in the field of the finder.

In order to divide the rotational driving force from a single zoom motor 14 between the finder unit 6 and the lens frame unit 11 in this manner, for example, as illustrated, one intermediate gear 25 is disposed at the branching point thereof. In short, it can be so constituted that the photographing optical system is made power variable by rotating the lens frame body 11c meshing the long gear lie with this intermediate gear 25 as shown in FIG. 7 when the finder unit 6 and the lens frame unit 11 are mounted on the camera body member 1, while the finder optical system is made power variable, by changing the position of the finder lens 6a in the optical axis direction by using the cam mechanism mentioned below, through the finder variable magnification gear (first and second FZ gears 17, 18 or the like).

The rotational driving force of the zoom motor 14 adopted for variable magnification is converted indirectly by a predetermined gear line, for example, the zoom gear line 16, however, it can also be constituted to allow appropriate modifications according to the kind of camera, so that a desired revolution, torque or rotation direction by the combination of a plurality of gears can be obtained.

Besides, the following adjusting method can be employed in order to adjust the variable magnification position of the finder optical system so as to precisely coincide with the variable magnification state of the photographing optical system.

When the finder unit 6 is mounted, an adjustment pin 68 shown in FIG. 6 is used as adjustment dedicated tool. This adjustment pint 68 is fitted into a pin hole 60b only when the variable position of the finder system is adjusted. And, a relative coincidence with the wide angle position of the photographing optical system is attempted by setting this, for example, at a position to be wide angle side. After the correct adjustment, that adjustment pin 68 is removed from the hole 60b.

Here, as shown in FIG. 5, individual elements are arranged so that the finder unit 6 does not interfere when the driving lens frame unit 10 with driving unit is removed from the camera body unit 100. More specifically, it is so arranged that configuration members of the other unit do not exist in the track of the driving lens frame unit 10 with driving unit when the driving lens frame unit 10 with driving unit is moved in the camera front direction (to the left in FIG. 5).

For instance, for the driving lens frame unit 10 with driving unit, a fixed amount of gap is provided in the vertical direction in FIG. 5 between a Z base plate end face 15a which is an end face of the Z base plate 15 which is one of members that the camera body unit 100 has, and a finder body end face 60a which is an end face of the finder body wall face 60a. Consequently, when the driving lens frame unit 10 with driving unit is removed from the camera body unit 100, it can be removed easily without interference between the Z base plate end face 15a and the finder body wall face 60a.

In addition, since the second FZ gear 18 and the F cam gear 67 are both made of spur gear, it is so that the engagement relationship of the both be released naturally when the driving lens frame unit 10 with driving unit is removed from the camera body unit 100.

In the assembly process, the assembly of the lens frame unit 11 with respect to the camera body member 1 may be performed in the initial stage of this camera assembly. Thereafter, it is also possible to mount the other function units such as the strobe unit 5, the finder unit 6 and the film feed unit 20 and the like on this camera body member 1. In such a case, in the conventional camera, the disassembly was performed in the inverse order of the assembly process. In this embodiment, without being restricted by the assembly order, the driving lens frame unit 10 with driving unit can be removed independently from the camera body member 1 even in the initial stage of the disassembly process.

Since the driving lens frame unit 10 with driving unit is attached to the camera body member 1 with screws 45a to 45d, the driving lens frame unit 10 with driving unit can be easily removed from the camera body unit 100 by removing these screws 45a to 45d. At this time, it is unnecessary to remove the strobe unit 5 or the finder unit 6 from the camera body unit 100.

Besides, in the electronic camera of recent years, necessarily electronic parts and printed circuit board are required, and this printed circuit board is arranged so as to cover a part of the lens frame unit, and therefore, this printed circuit board had also to be removed before removing this lens frame unit. However, in this embodiment, the K flex 12 or the Z flex 35 that the driving lens frame unit 10 with driving unit has can be removed from the camera body unit only by removing screws in the connect portion 36. Consequently, it is unnecessary to remove the electric board concerning the other units.

Further, in the driving coupling portion between the driving unit 9 and the finder unit 6 constituting a part of the driving lens frame unit 10 with driving unit, since the coupling is made by spur gears, this coupling is released only by moving the driving lens frame unit 10 with driving unit toward the camera front.

Thus, as the result of a unit configuration allowing to remove independently the respective units 5, 6, 20 with respect to the camera body unit 1, a camera with a higher degree of freedom for the order of assembly/disassembly can be obtained.

Therefore, the configuration of a unit always maintaining the independence both in assembly and disassembly can be realized, and the respective work can be easily performed, at the same time, since the unit requiring repair can be separated from the camera body unit 100 and sent to the repair department or the like, the sending and management procedures thereof become easier.

(Modifications)

The illustrated embodiment can also be modified, and an effect equal or superior to the embodiment can be expected. For example, in the strobe unit 5, a shifting mechanism or the like similar to the variable magnification mechanism provided in the finder unit 6 can also be provided. By doing so, the reach range of the flash to be emitted can be varied according to the variable magnification state of the zoom variable magnification mechanism of the photographing optical system.

Besides, in this embodiment, in a state where the lens frame unit 11 and the driving unit 9 are attached, both are made decomposable and removable with respect to the camera body unit 100 integrally as the driving lens frame unit 10 with driving unit, both can also be made decomposable and removable independently. In this case, for example, the driving unit 9 may be attached to the camera body member 1. There, both may be arranged respectively so that the driving unit 9 does not enter the track when the lens frame unit 11 is released from the camera body unit 100.

Note that such a technique can be applied similarly to a device or the like constituted of a plurality of units, in addition to the illustrated zoom type automatic focusing camera. At this time, an effect equivalent or superior to these examples can be expected, if the spirit of the present invention can be similarly executed for an arrangement configuration in consideration of the frequency of fault occurrence.

Otherwise, various modifications can be realized without departing from the scope of the present invention.

(Effect of the Invention)

According to the Invention, a camera allowing to easily perform the disassembly, repair and assembly can be provided by making the lens frame unit easily detachable with respect to the camera body unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera formed by combining a plurality of units, said camera comprising:

a camera body member;

a lens frame unit which is attachable to and detachable from said camera body member;

a function unit other than said lens frame unit which is also attachable to said camera body member; and an electric board mounted in the camera body member, and arranged at a position away from a path through which the lens frame unit passes when the lens frame unit is attached to and detached from the camera body member;

wherein said lens frame unit is attachable to and detachable from said camera body member in a state where attachment between said function unit and said camera body member is maintained.

2. The camera according to claim 1, wherein said function unit is a finder unit.

3. The camera according to claim 1, wherein said function unit is a strobe unit.

4. The camera according to claim 1, wherein said function unit is a film driving unit.

5. The camera according to claim 1, further comprising a driving unit for driving a photographing optical system in said lens frame unit in an optical axis direction, and wherein said driving unit is not coupled to said camera body member but is coupled to said lens frame unit.

6. The camera according to claim 5, wherein the photographing optical system in said lens frame unit is driven by a driving force of said driving unit in a state where said lens frame unit and said driving unit are coupled.

7. The camera according to claim 5, wherein said photographing optical system is a variable magnification optical system whose photography magnification can be modified by driving in the optical axis direction.

8. The camera according to claim 1, wherein said lens frame unit includes an electric board on which electric parts for the lens frame unit are mounted, and said electric board is connected with the electric board mounted in the camera body via electric contacts.

9. A camera formed by combining a plurality of units, said camera comprising:

a camera body member;

a lens frame unit which is attachable to and detachable from said camera body member;

a finder unit other than said lens frame unit which is also attachable to said camera body member; and a driving unit for driving a photographing optical system in said lens frame unit and a finder optical system in said finder unit in an optical axis direction;

wherein said lens frame unit is attachable to and detachable from said camera body member in a state where attachment between said finder unit and said camera body member is maintained; and wherein said driving unit is not coupled to said camera body member but is coupled to said lens frame unit.

10. The camera according to claim 9, wherein said photographing optical system and said finder optical system are variable magnification optical systems whose magnification power is changeable by driving in the optical axis direction, and said driving unit changes the magnification power by interlocking said photographing optical system and said finder optical system.

11. A camera having a camera body unit formed by combining a plurality of units, said camera comprising:
a lens frame unit having at least a photographing optical system; and
an electric board mounted in the camera body unit, and arranged at a position away from a path through which the lens frame unit passes when the lens frame unit is attached to and detached from the camera body unit;
wherein said lens frame unit is removable from the camera body unit before other units when said camera is disassembled and repaired.

12. A camera comprising:
a camera body member;
a photographing optical unit including a photographing optical system which is attachable to said camera body member;
a finder unit including a finder optical system for observing a photography object; and
an electric board mounted in the camera body member, and arranged at a position away from a path through which the photographing optical unit passes when the photographing optical unit is attached to and detached from the camera body member;
wherein said photographing optical unit and said finder unit are both mountable on said camera body member, and said photographing optical unit is removable from said camera body member without removing said finder unit from said camera body member when said photographing optical unit and said finder unit are both mounted on said camera body member.

13. The camera according to claim 12, wherein said photographing optical system is a variable magnification system, and a driving mechanism for changing a power of the variable magnification system is provided in said photographing optical unit.

14. The camera according to claim 12, further comprising a strobe unit including a strobe optical system for illuminating the photography object, and wherein said photographing optical unit, said finder unit and said strobe unit are all mountable on said camera body member, and said photographing optical unit is removable from said camera body member without removing said finder unit and said strobe unit when said photographing optical unit, said finder unit and said strobe unit are all mounted on said camera body member.

15. The camera according to claim 12, wherein said photographing optical system is fixed to said camera body member from a back side of the camera with screws.

16. A camera comprising:
a camera body member;
a photographing optical unit including a photographing optical system which is attachable to said camera body member; and
a finder unit including a finder optical system for observing a photography object;
wherein said photographing optical unit and said finder unit are both mountable on said camera body member, and said photographing optical unit is removable from said camera body member without removing said finder unit from said camera body member when said photographing optical unit and said finder unit are both mounted on said camera body member;

wherein said photographing optical system and said finder optical system are variable magnification optical systems whose magnification power is changeable by driving in an optical axis direction, and said magnification power is changed by interlocking said photographing optical system and said finder optical system.

17. A camera comprising:
a camera body member;
a driving lens frame unit which is attachable to and detachable from said camera body member, and which has a photographing optical system and a driving mechanism for driving said photographing optical system inside;
a function unit other than said driving lens frame unit which is also attachable to said camera body member; and
an electric board mounted in the camera body member, and arranged at a position away from a path through which the driving lens frame unit passes when the driving lens frame unit is attached to and detached from the camera body member;
wherein said driving lens frame unit is attachable to and detachable from said camera body member in a state where attachment between said function unit and said camera body member is maintained.

18. A camera comprising:
a camera body member;
a driving lens frame unit which is attachable to and detachable from said camera body member, and which has a photographing optical system and a driving mechanism for driving said photographing optical system;
a function unit other than said driving lens frame unit which is also attachable to said camera body member; and
an electric board mounted in the camera body member, and arranged at a position away from a path through which the driving lens frame unit passes when the driving lens frame unit is attached to and detached from the camera body member;
wherein configuration members of said function unit do not exist in a track of said driving lens frame unit when said driving lens frame unit is removed from said camera body member.

19. The camera according to claim 18, wherein said function unit is a finder unit having a finder optical system.

20. A camera comprising:
a camera body member;
a driving lens frame unit which is attachable to and detachable from said camera body member, and which has a photographing optical system and a driving mechanism for driving said photographing optical system;
a finder unit which is also attachable to said camera body member, and which has a finder optical system;
wherein configuration members of said function unit do not exist in a track of said driving lens frame unit when said driving lens frame unit is removed from said camera body member; and
wherein said driving lens frame unit has a second spur gear engaged with a first spur gear of said finder unit.

* * * * *